(12) United States Patent
Peterson et al.

(10) Patent No.: US 7,597,118 B1
(45) Date of Patent: Oct. 6, 2009

(54) PNEUMATIC PRESSURE RELIEF TEST PLUG

(75) Inventors: Stephen Peterson, Chaska, MN (US); Richard Larson, Victoria, MN (US)

(73) Assignee: IPS Corporation, Collierville, TN (US)

( * ) Notice: Subject to any disclaimer, the term of this patent is extended or adjusted under 35 U.S.C. 154(b) by 0 days.

(21) Appl. No.: 12/411,999

(22) Filed: Mar. 26, 2009

(51) Int. Cl.
    *F16L 55/12* (2006.01)
(52) U.S. Cl. .......................... 138/93; 138/90; 137/224; 137/226
(58) Field of Classification Search .................. 138/89, 138/93; 137/224, 226
    See application file for complete search history.

(56) References Cited

U.S. PATENT DOCUMENTS

| | | | | |
|---|---|---|---|---|
| 3,241,571 A | * | 3/1966 | Garcia | 138/90 |
| 3,291,156 A | | 12/1966 | Corsano | 138/89 |
| 3,494,504 A | | 2/1970 | Jackson | 138/89 X |
| 3,613,936 A | | 10/1971 | Kaiser et al. | 138/89 X |
| 3,667,640 A | | 6/1972 | Morrow | 138/89 X |
| 4,303,101 A | | 12/1981 | Tholen | 138/89 |
| 4,312,708 A | | 1/1982 | Leslie | 138/89 X |
| 4,493,344 A | | 1/1985 | Mathison et al. | 138/89 |
| 4,542,642 A | | 9/1985 | Tagliarino | 138/90 X |
| 4,585,033 A | | 4/1986 | Westman | 138/89 |
| 4,614,206 A | | 9/1986 | Mathison et al. | 138/93 |
| 4,658,861 A | * | 4/1987 | Roberson, Sr. | 138/90 |
| 4,820,474 A | | 4/1989 | Leslie et al. | 138/89 X |
| 5,035,266 A | | 7/1991 | Benson et al. | 138/92 |
| 5,076,328 A | | 12/1991 | Lyon | 138/93 |
| 5,131,433 A | * | 7/1992 | Sion et al. | 138/93 |
| 5,181,977 A | * | 1/1993 | Gneiding et al. | 152/429 |
| 5,209,266 A | | 5/1993 | Hiemsoth | 138/90 |
| 5,234,034 A | | 8/1993 | Lyon | 138/93 |
| 5,348,085 A | | 9/1994 | Benson | 166/92.1 |
| 5,353,841 A | | 10/1994 | Mathison et al. | 138/93 |
| 5,413,136 A | * | 5/1995 | Prescott | 137/68.3 |

(Continued)

OTHER PUBLICATIONS

G.T. Water Products, Inc.; SAFE-T-SEAL Test Plugs product information (5 pgs.) http://www.gtwaterproducts.com/safe.html (cited visited Nov. 7, 2008).
G.T. Water Products, Inc.; New Innovations (2 pgs.) http://www.gtwaterproducts.com/new.html (cited visited Nov. 7, 2008).

(Continued)

*Primary Examiner*—Patrick F Brinson
(74) *Attorney, Agent, or Firm*—Alston & Bird LLP

(57) ABSTRACT

The present invention provides a pneumatic test plug that seals a portion of a pipe section having a generally cylindrical internal pipe wall. In general, the pneumatic test plug includes an inflation valve mounted in the bladder wall of an inflatable bladder. The inflation valve includes a main air passageway through which air is introduced into the bladder and a separate release channel. The separate release channel includes an inlet disposed toward an interior end of the inflation valve and an outlet in fluid communication with an exterior environment outside the bladder. When in a sealed position, a sealing portion of the bladder engages the interior end of the inflation valve and sealingly closes the inlet of the release channel. When the sealing portion is elastically deflected by overinflation of the bladder, the sealing portion uncovers the inlet of the release channel to allow air to escape from the interior area of the bladder through the release channel to the exterior environment.

18 Claims, 7 Drawing Sheets

U.S. PATENT DOCUMENTS

| | | | | |
|---|---|---|---|---|
| 5,771,937 | A | 6/1998 | Collins | 138/93 |
| 5,778,923 | A * | 7/1998 | Marston | 137/226 |
| 6,116,286 | A | 9/2000 | Hooper et al. | 138/93 |
| 6,230,327 | B1 * | 5/2001 | Briand et al. | 2/8.1 |
| 6,427,714 | B2 * | 8/2002 | Freigang et al. | 137/225 |
| 6,502,603 | B2 | 1/2003 | Lane, Jr. | 138/89 |
| 6,513,549 | B2 | 2/2003 | Chen | 138/89 |
| 6,901,966 | B2 * | 6/2005 | Onuki et al. | 138/93 |
| 7,013,926 | B1 * | 3/2006 | Storey et al. | 138/93 |
| 7,021,337 | B2 | 4/2006 | Markham | 138/90 |
| 7,325,574 | B1 | 2/2008 | Beckey | 138/93 |
| 7,404,412 | B2 * | 7/2008 | Milanovich et al. | 137/226 |

OTHER PUBLICATIONS

Cherne Industries Inc.; Pneumatic Plugs—Single-Size Test-Ball® (¾" through 6") product information (1 pg.) www.cherneind.com.

Cherne Industries Inc.; Pneumatic Plugs—Single-Size Test-Ball® (8" through 12") product information (1 pg.) www.cherneind.com.

Cherne Industries Inc.; Pneumatic Plugs—Clean-Seal® Plugs product information (1 pg.) www.cherneind.com.

Cherne Industries Inc.; Pneumatic Plugs—Long Test-Ball® & MS2® Test-Ball product information (1 pg.) www.cherneind.com.

IPS Corporation; Multi-Size Pneumatic Pipe Plugs product information (1 pg.).

* cited by examiner

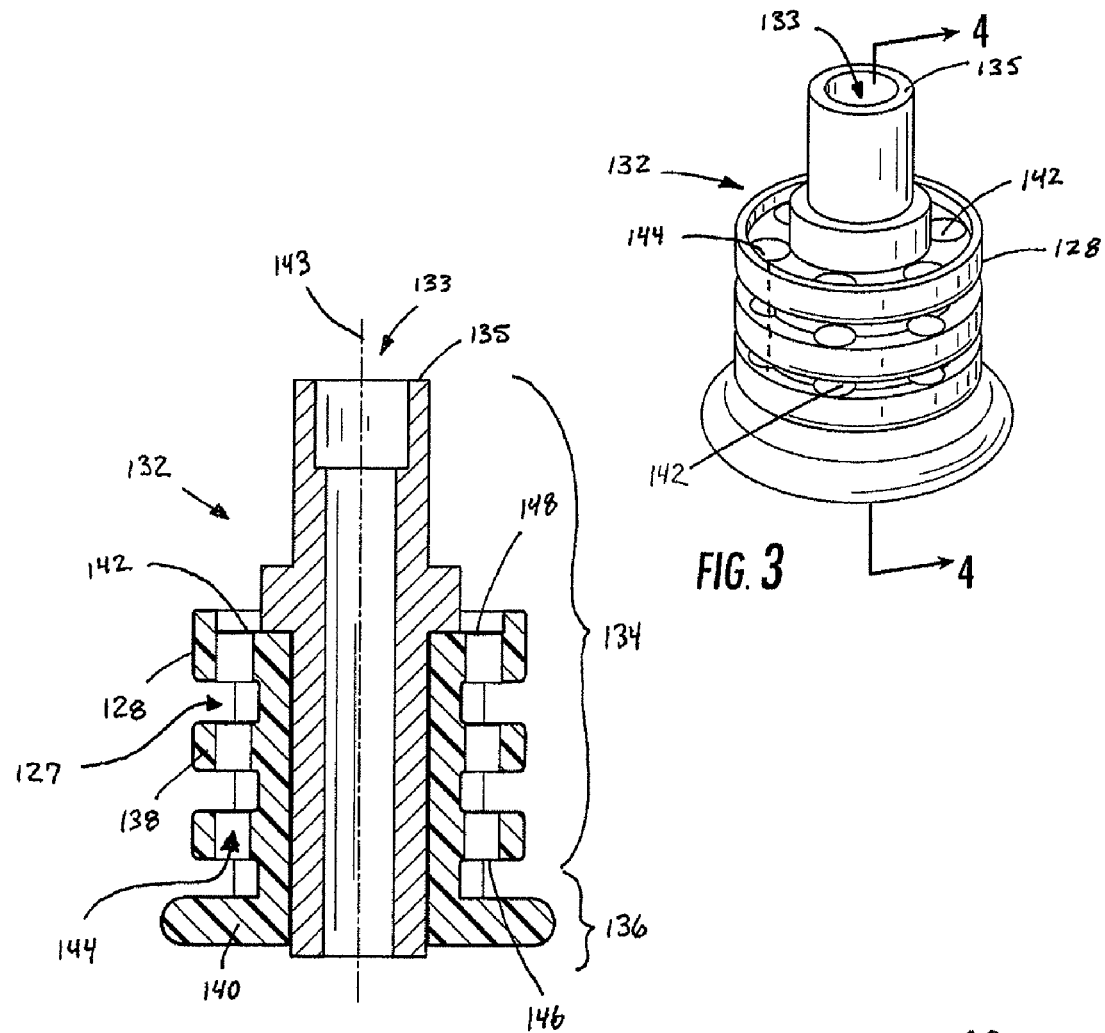
FIG. 3
FIG. 4
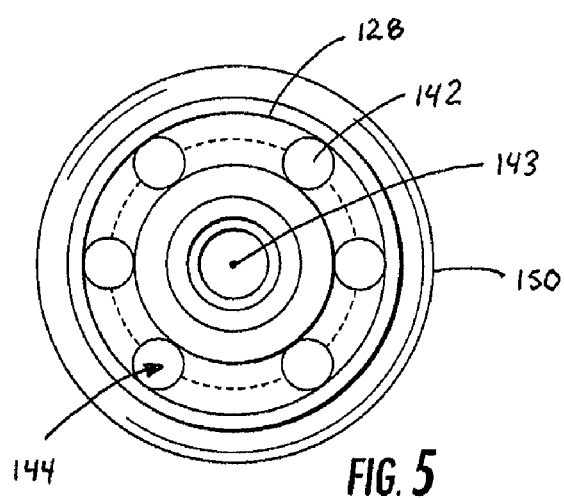
FIG. 5

PNEUMATIC PRESSURE RELIEF TEST PLUG

FIELD OF THE INVENTION

The present invention relates to plug devices for use in pipe systems, and more particularly to pneumatic test plug devices for sealing pipes or conduits at access ports and tee-connections.

BACKGROUND OF THE INVENTION

Pipe or plumbing systems often include access openings or ports that allow the interior of the pipes of the pipe system to be inspected and/or cleaned. Access opening configurations for such pipe systems can vary in size and shape, although many configurations are standardized. In one common configuration, an access opening (often referred to as a "clean-out") is provided at the end of a relatively short section of cylindrical pipe that extends away from the axis of the main pipe section. Clean-outs may extend from a main pipe section at any angle. Those that extend approximately 90 degrees from the main pipe section are commonly called "clean-out tees" (referring to the T-shape created by the intersecting pipe sections). Other access openings include, but are not limited to, roof vents, storm drains, closet bends, and pipe ends.

Access openings may also be used to test the integrity of the pipe system. Currently, this is accomplished by placing temporary test plugs in the clean-outs or other openings of the pipe system. A test media such as water or air is then introduced into the pipe system for a period of time to determine if there are any leaks. After successful testing, the test plugs are removed. Test plugs can generally be categorized into mechanical test plugs and pneumatic test plugs. Existing mechanical test plugs typically include devices that seal pipe systems via mechanical activation, such as by turning a threaded connection member to expand an elastomeric ring that seals an inner surface of a pipe section. Existing pneumatic test plugs include elongate elastomeric bladders that are attached directly to an air source. The bladders are inserted into the pipe system through the clean-outs or other access openings and are then inflated to seal the pipe section. After testing, the test plugs are deflated or deactivated and then removed from the pipe system.

Although some existing pneumatic test plugs may display a maximum inflation pressure on the outside of the bladder, this does not provide protection for overinflation, but instead relies on the diligence of the operator and the existence and accuracy of an air inlet pressure gauge. If the elastomeric bladders of such pneumatic test plugs were to be overinflated, problems could occur. These problems may include damage to the test plug, damage to the pipe system, and/or other inconveniences for the operator. A proposed solution to this problem involves using an external pressure regulator or external pressure relief device on the air inlet, but these solutions are cumbersome and are often ignored by operators. They also increase the time required to inflate the bladder. Additionally, many pressure regulators must be set before inflation begins, and regulation settings may differ for pipes having different internal diameters.

Other existing pneumatic test plugs include integrated pressure relief devices; however, the present inventors have found that these particular pressure relief devices tend to leak, do not provide repeatable results, and may disrupt testing of the pipe system. Specifically, some pneumatic test plugs include relief valves that have mechanical springs and seals; other pneumatic test plugs include relief valves that are positioned on the backside of the elastomeric bladder. The present inventors have found that pneumatic test plugs employing the former pressure relief devices may be prone to fouling and tend to collect contamination, thus negatively affecting their performance. Similarly, the present inventors have found that pneumatic test plugs employing the latter pressure relief devices may release excess air into the enclosed area of the pipe system behind the test plug, thus tending to force the test plug out of the clean-out access area and disrupting the test.

As a result, there is a need for an improved pneumatic test plug for use with a pipe section having a generally cylindrical internal pipe wall. The pneumatic test plug should be easy to use and should not require the operator to make additional settings or readings. It should be reliable, provide repeatable results, and it should not require additional external equipment or otherwise disrupt testing of the pipe system.

BRIEF SUMMARY OF VARIOUS EMBODIMENTS

The present invention addresses the above needs and achieves other advantages by providing a pneumatic test plug for use with a pipe having a generally cylindrical internal pipe wall. In general, the pneumatic test plug includes an inflatable bladder formed by a bladder wall that is elastically deformable, and an inflation valve mounted in the bladder wall such that an interior end of the inflation valve is in fluid communication with an interior area defined within the bladder. The inflation valve defines a main air passageway through which air is introduced into the interior area, and a separate release channel having an inlet disposed toward the interior end of the inflation valve and an outlet in fluid communication with an exterior environment outside the bladder. The valve is mounted in the bladder wall such that a sealing portion of the bladder wall when in a sealed position engages the interior end of the inflation valve and sealingly closes the inlet of the release channel. When the sealing portion is elastically deflected by overinflation of the bladder, the sealing portion uncovers the inlet of the release channel to allow air to escape from the interior area of the bladder through the release channel to the exterior environment. The sealing portion elastically returns to the sealed position when sufficient release of air has occurred. In some embodiments, the inflation valve further defines a first portion, and a second portion defining the interior end, wherein the interior end of the inflation valve is proximate the sealing portion of the bladder wall, and wherein overinflation of the bladder causes the sealing portion of the bladder wall to separate from the interior end of the inflation valve. In some embodiments, the inflation valve includes a plurality of release channels disposed radially about a center axis of the inflation valve.

Some embodiments further comprise a collar and the collar is configured to couple the first portion of the inflation valve to an open end of the bladder. In some embodiments, the inflation valve is insert-molded inside an open end of the bladder. In some embodiments, the interior end the inflation valve includes a flange and a release channel inlet, the flange defining an edge surface and the release channel inlet being located above the flange and leading to the release channel, wherein the sealing portion of the bladder wall substantially surrounds the edge surface of the flange and blocks the release channel inlet, and wherein overinflation of the bladder causes a portion of the interior surface of the bladder wall to separate from the edge surface of the flange, thus releasing air from the interior area of the bladder around the edge surface of the flange and into the release channel inlet. In some embodiments, the inflation valve further includes a Schrader valve located approximately in the center of the inflation valve, and the Schrader valve is configured to allow pressurized air to enter the interior area of the bladder and to allow manual depressurization of the bladder. In some embodiments, the Schrader valve is insert-molded inside the inflation valve. In some embodiments, the bladder wall includes one or more ribs disposed around the exterior surface of the bladder wall, and wherein the one or more ribs are configured to facilitate sealing against the internal pipe wall. Some embodiments further comprise a handle device, wherein the handle device is configured to facilitate removal of the pneumatic test plug from the pipe in an uninflated position.

Another embodiment provides an inflation valve for use with an inflatable bladder formed by a bladder wall that is elastically deformable, the bladder defining an interior area within the bladder. In general the inflation valve includes an interior end that is in fluid communication with the interior area of the bladder, a main air passageway through which air is introduced into the interior area of the bladder, and a separate release channel having an inlet disposed toward the interior end and an outlet in fluid communication with an exterior environment outside the bladder. The inflation valve is configured to be mounted in the bladder wall such that a sealing portion of the bladder wall when in a sealed position engages the interior end and sealingly closes the inlet of the release channel. When the sealing portion is elastically deflected by overinflation of the bladder, the sealing portion uncovers the inlet of the release channel to allow air to escape from the interior area of the bladder through the release channel to the exterior environment. The sealing portion elastically returns to the sealed position when sufficient release of air has occurred. In some embodiments, the inflation valve further defines a first portion, and a second portion defining the interior end, wherein the interior end is proximate the sealing portion of the bladder wall, and wherein overinflation of the bladder causes the sealing portion of the bladder wall to separate from the interior end. In some embodiments, the inflation valve includes a plurality of release channels disposed radially about a center axis. In some embodiments, the first portion of the inflation valve is configured to be coupled to an open end of the bladder using a collar. In some embodiments, the inflation valve is configured to be insert-molded inside an open end of the bladder. In some embodiments, the interior end of the inflation valve includes a flange and a release channel inlet, the flange defining an edge surface and the release channel inlet being located above the flange and leading to the release channel, wherein the sealing portion of the bladder wall substantially surrounds the edge surface of the flange and blocks the release channel inlet, and wherein overinflation of the bladder causes a portion of the interior surface of the bladder wall to separate from the edge surface of the flange, thus releasing air from the interior area of the bladder around the edge surface of the flange and into the release channel inlet. In some embodiments, the inflation valve further includes a Schrader valve located approximately in the center of the inflation valve, and wherein the Schrader valve is configured to allow pressurized air to enter the interior area of the bladder and to allow manual depressurization of the bladder. In some embodiments, the Schrader valve is insert-molded inside the inflation valve.

BRIEF DESCRIPTION OF THE DRAWINGS

Figure 1:
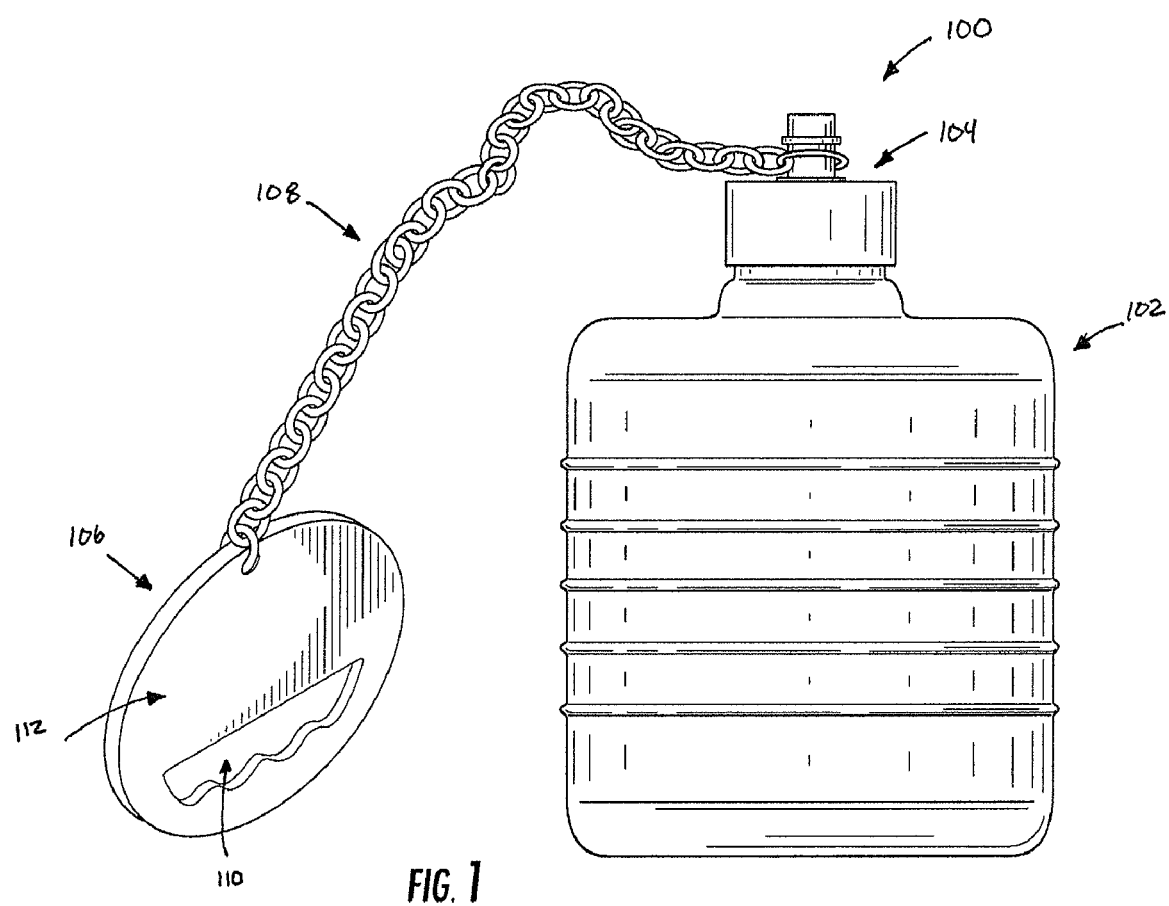
Figure 2:
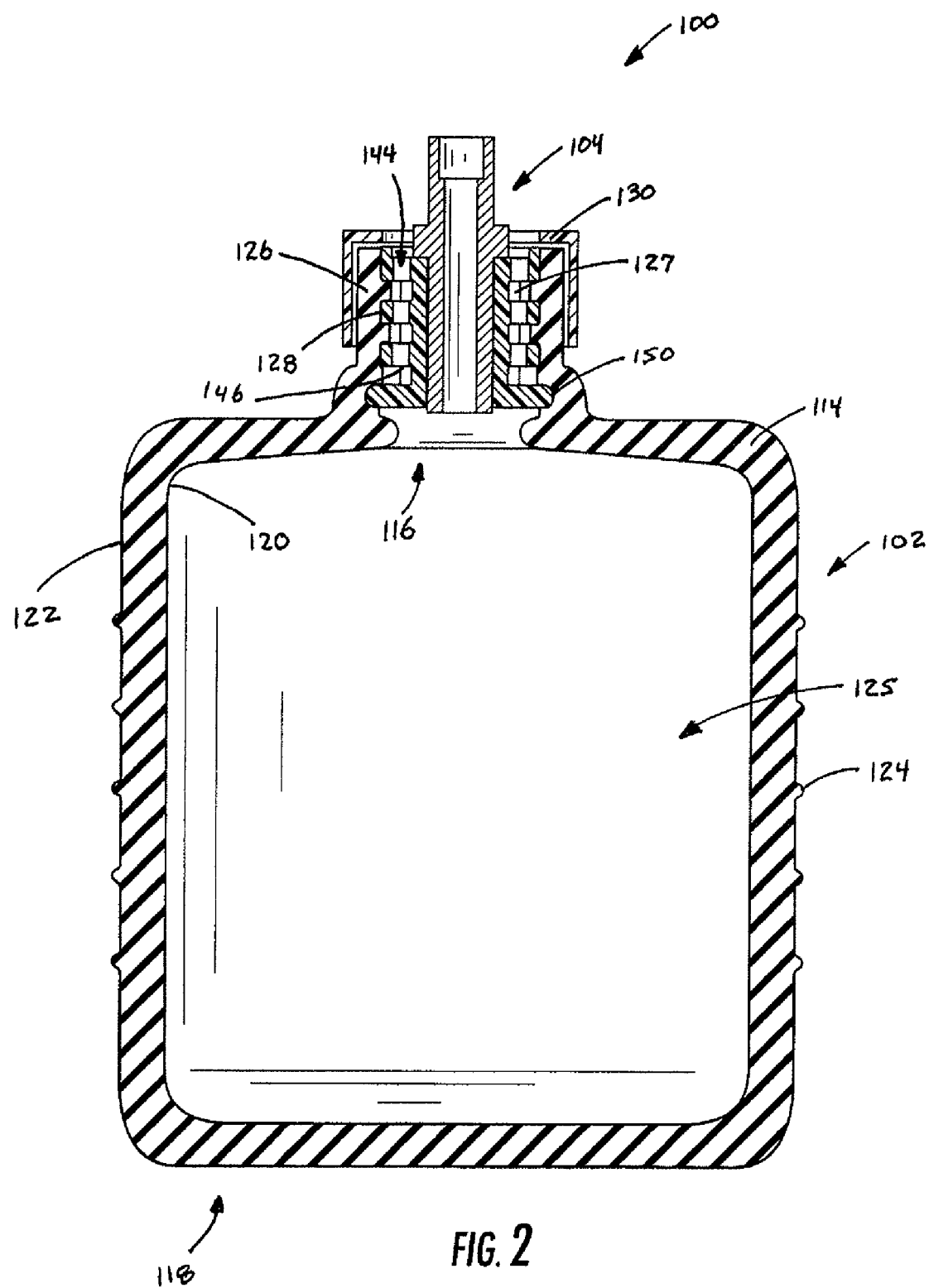
Figure 6:
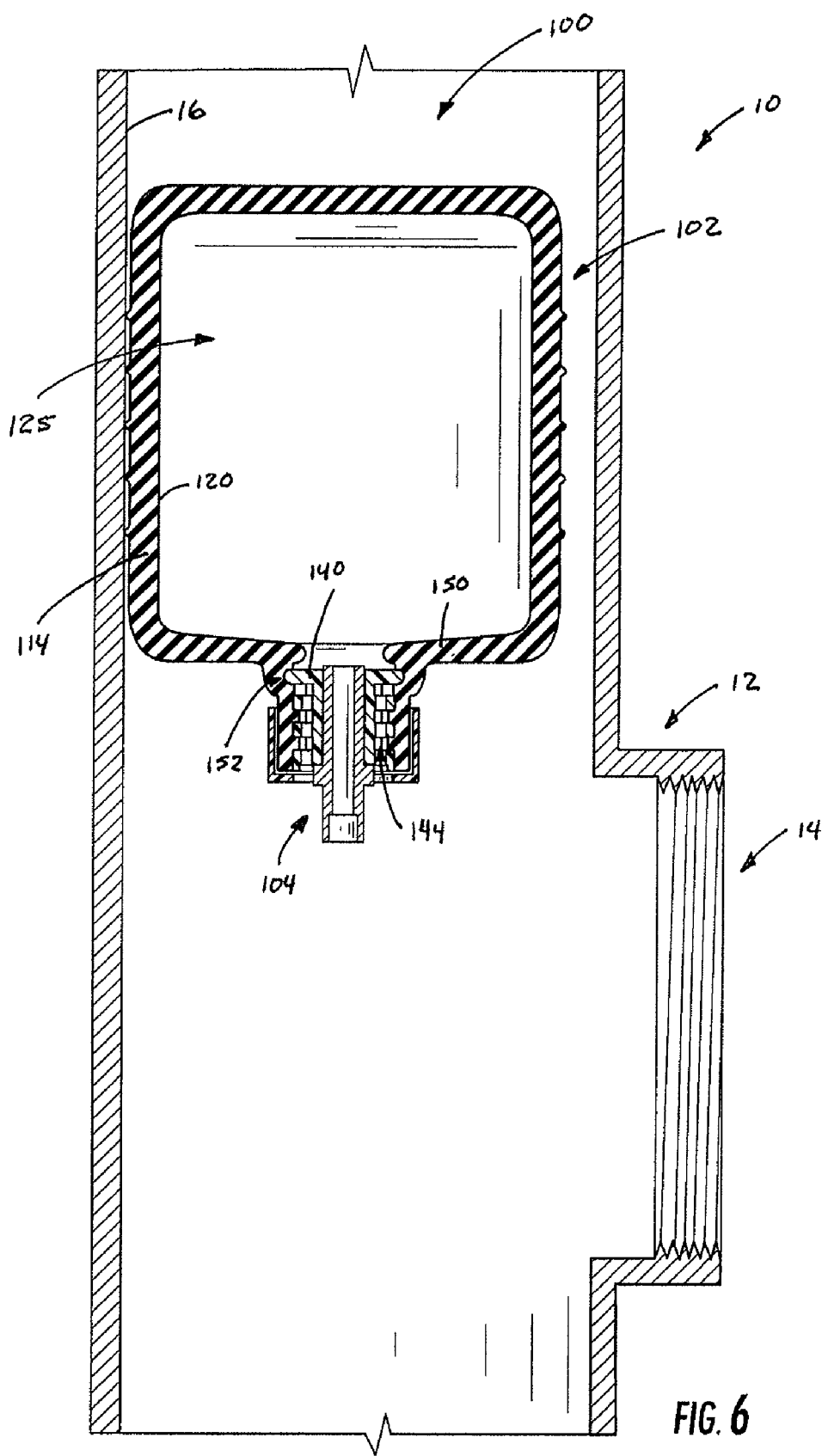
Figure 7:
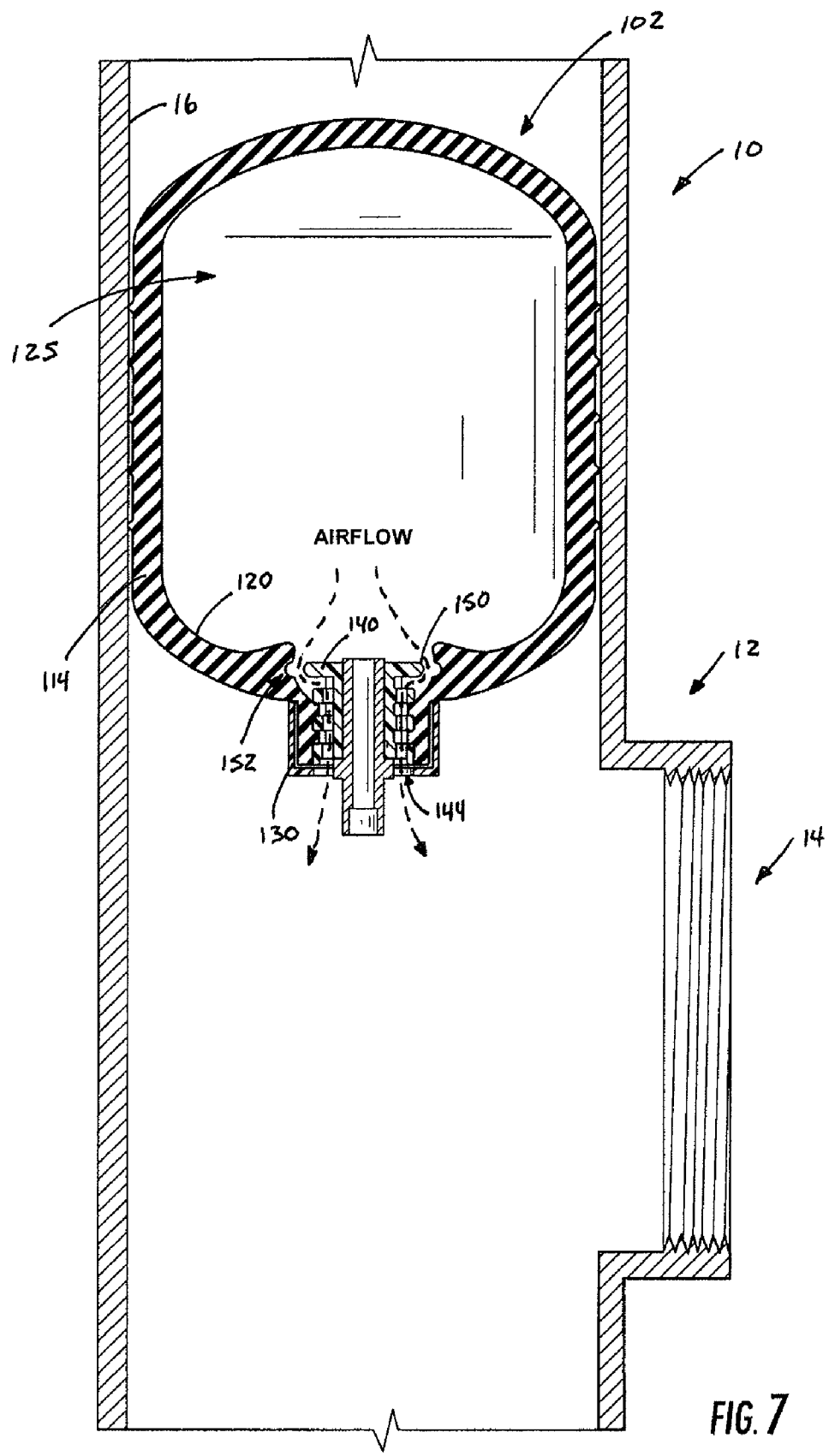
Figure 8:
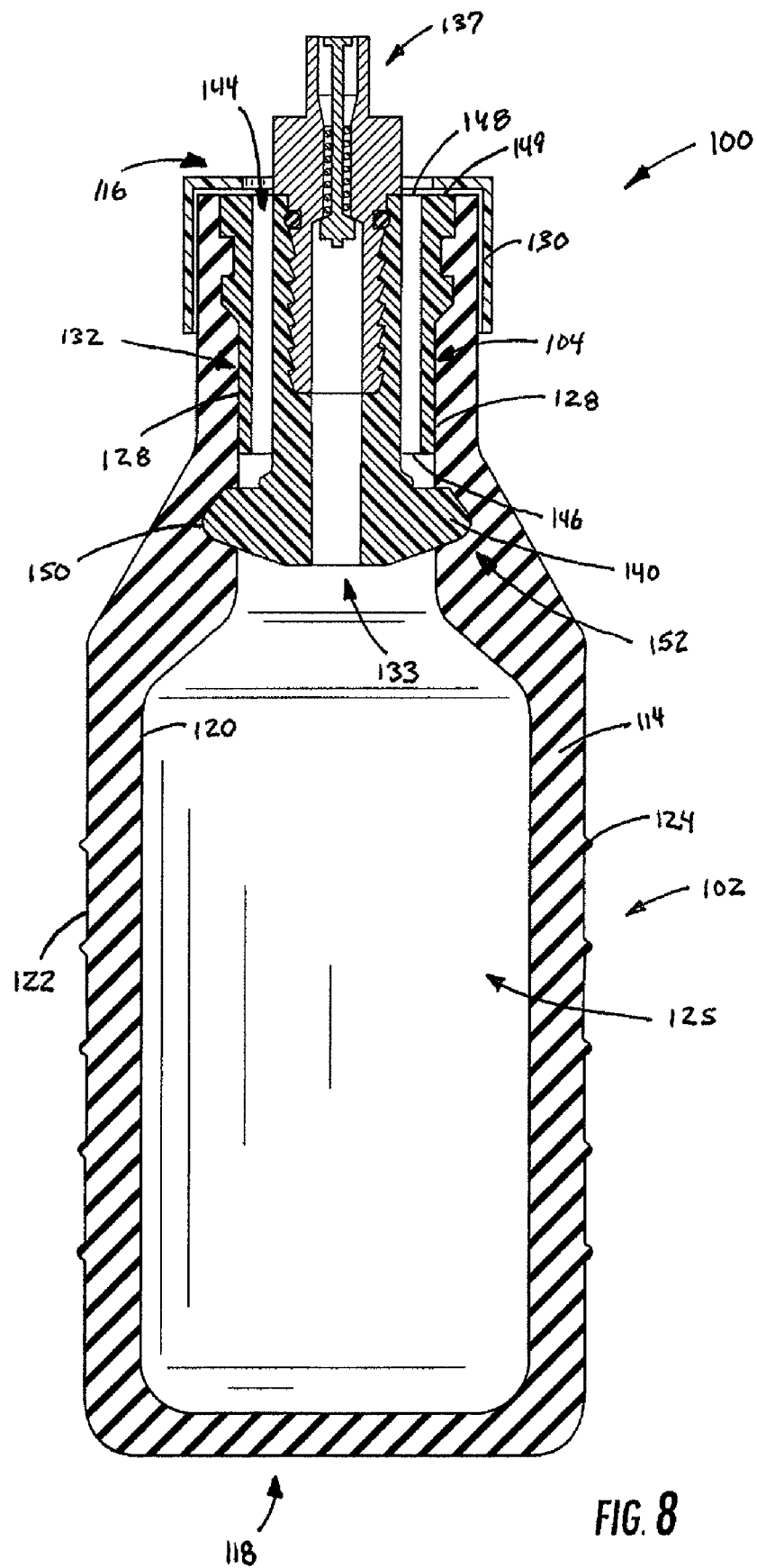
Figure 9:
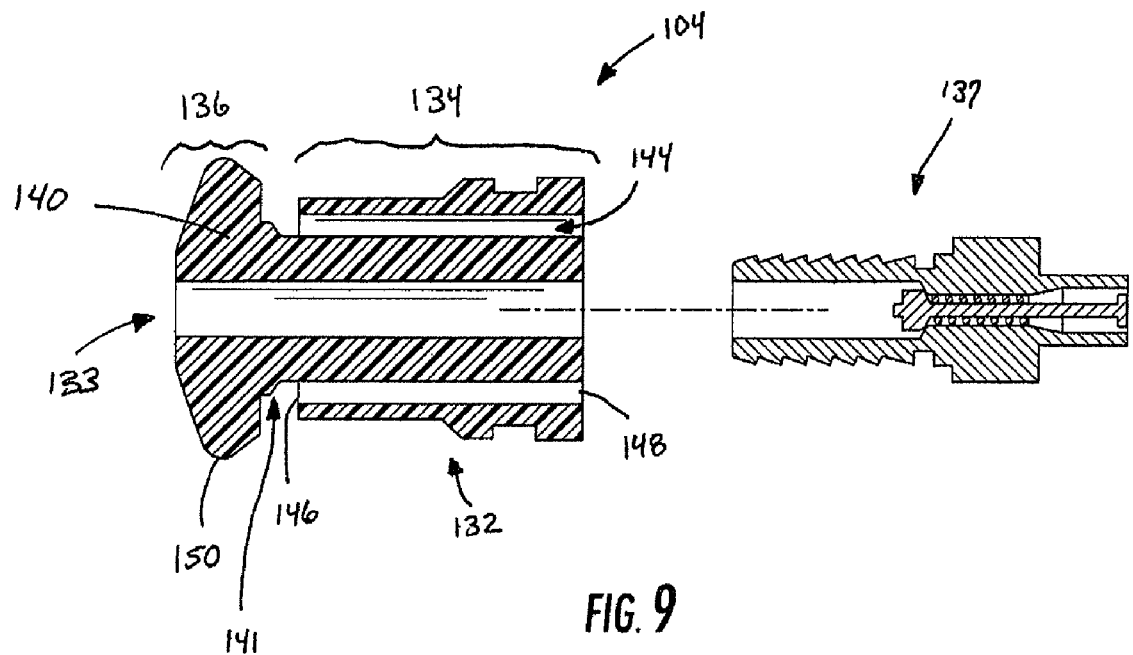
Figure 10:
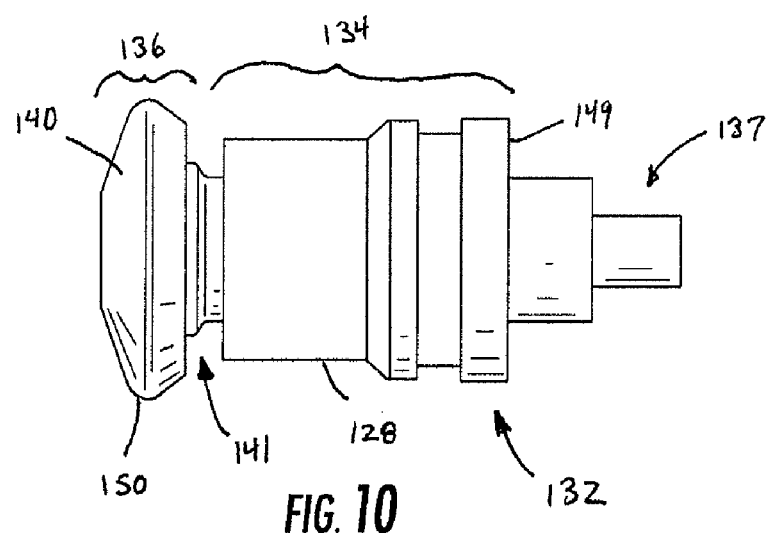

Having thus described the invention in general terms, reference will now be made to the accompanying drawings, which are not necessarily drawn to scale, and wherein:

FIG. 1 is a front view of a pneumatic test plug in accordance with one exemplary embodiment of the present invention;

FIG. 2 is a cross-section view of a pneumatic test plug in accordance with one exemplary embodiment of the present invention;

FIG. 3 is perspective view of an inflation valve in accordance with one embodiment of the present invention;

FIG. 4 is a cross-section view of the inflation valve of the pneumatic test plug of FIG. 3 in accordance with one exemplary embodiment of the present invention;

FIG. 5 is a top view of the inflation valve of FIG. 3 in accordance with one exemplary embodiment of the present invention;

FIG. 6 is a cross-section view of a clean-out tee and a pneumatic test plug shown in an uninflated condition in accordance with one exemplary embodiment of the present invention;

FIG. 7 is a cross-section view of the clean-out and pneumatic test plug of FIG. 6 shown in an overinflated condition in accordance with one exemplary embodiment of the present invention;

FIG. 8 is a cross-section view of a pneumatic test plug in accordance with another embodiment of the present invention;

FIG. 9 is a cross-section view of an inflation valve in accordance with one embodiment of the present invention; and FIG. 10 is a front view of the inflation valve of FIG. 9 in accordance with one embodiment of the present invention.

DETAILED DESCRIPTION

The present invention now will be described more fully hereinafter with reference to the accompanying drawings, in which some but not all embodiments of the invention are shown. Indeed, the present invention may be embodied in many different forms and should not be construed as limited to the embodiments set forth herein; rather, these embodiments are provided so that this disclosure will satisfy applicable legal requirements. Like numbers refer to like elements throughout.

The present invention describes various embodiments of a pneumatic test plug that is configured, in an uninflated condition, to be inserted into a pipe section through an access port or opening. In operation, the pneumatic test plug may be inflated to seal against the internal pipe wall of the pipe section. After being used, it may be deflated and removed from the pipe section. In general, the pneumatic test plug of the present invention includes an inflation valve having at least one release channel disposed proximate a portion of the outer surface of the inflation valve, wherein overinflation of the bladder causes a portion of the interior surface of the bladder wall to separate from the outer surface of the inflation valve, thus releasing air from the inner area to the environment through the release channel.

FIG. 1 shows a front view of a pneumatic test plug 100 in accordance with one exemplary embodiment of the present invention. In general, the pneumatic test plug 100 includes a bladder 102 and an inflation valve 104. The pneumatic test plug 100 of the depicted embodiment is also shown with a handle device 106, which in various embodiments may be attached to the pneumatic test plug 100. Although not all embodiments of the present invention include a handle device, in the depicted embodiment the handle device 106 facilitates removal of the pneumatic test plug 100 from the pipe section through the clean-out access opening or port. In the depicted embodiment the handle device 106 is attached to the pneumatic test plug 100 via the inflation valve 104, although in other embodiments it may be attached to the bladder 102 and/or any other component of the pneumatic test plug 100. In the depicted embodiment, the handle device 106 is attached to the pneumatic test plug with an attachment chain 108, however in other embodiments any suitable attachment means may be used including, but not limited to, rope, cable, wire, chain, etc. Although in various embodiments the handle device 106 may have other configurations, the handle device 106 of the depicted embodiment has a generally circular profile and includes a gripping portion 110 configured to allow an operator's fingers to pass therethrough. In various embodiments the handle device 106 may also have other functions; for example, it may include a surface 112 that may display text or symbols that instruct the operator how to properly use the pneumatic test plug 100. The handle device 106 may also display a particular color that may signify that a test plug is in use, such as, for example, orange, yellow, or red. In the depicted embodiment the handle device 106 is constructed of a plastic material and the attachment chain is constructed of a metal material; however, in other embodiments the handle device and/or the attachment means may be constructed of any suitable materials including, but not limited to, metal, plastic, and composite materials, and combinations thereof.

FIG. 2 is a cross-section view of a pneumatic test plug 100 in accordance with one exemplary embodiment of the present invention, showing the bladder 102 and the inflation valve 104. In the depicted embodiment, the bladder 102 defines a bladder wall 114 and has an open end 116 and a closed end 118. The bladder wall 114 defines an interior surface 120 and an exterior surface 122, and an interior area 125 is bounded by the interior surface 120 of the bladder wall 114. In various embodiments of the present invention, a series of ribs 124 are defined in the exterior surface 122 of the bladder wall 114 that extend around the exterior surface 122. Although other embodiments of the present invention need not include ribs 124, it is believed that the ribs 124 provide improved sealing with the internal pipe wall and help prevent the pneumatic test plug 100 from becoming dislodged during testing. It should be noted that in still other embodiments of the present invention, the ribs 124 may have a variety of configurations and thus the ribs 124 need not have the orientation, shape, size, etc. of those shown in the figure.

In the depicted embodiment the bladder 102 has a generally cylindrical shape and is constructed of an elastomeric rubber material, however in other embodiments the bladder may be constructed of different inflatable materials and may have a variety of different shapes, including, but not limited to, generally spherical, ovoid, bottle, or pillow shaped. In various embodiments, a portion of the open end 116 of the bladder wall 114 is configured to couple to the inflation valve 104. Although in other embodiments, different coupling methods are possible (such as for example, threading, press-fitting, or insert-molding the inflation valve 104 into the open end 116 of the bladder 102), in the embodiment depicted in FIG. 1 and FIG. 2, the interior surface 120 of the open end 116 of the bladder wall 114 includes a series of rings 126 that generally fit into a series of grooves 127 (shown more clearly in FIG. 4) of an outer surface 128 of the inflation valve 104. In the depicted embodiment, a collar 130 that may be crimped secures the inflation valve 104 to the open end 116 of the bladder 102.

FIG. 3 is perspective view of an inflation valve 104 of FIG. 2; FIG. 4 is a cross-section view of the inflation valve 104; and FIG. 5 is a top view of the inflation valve 104. The inflation valve 104 of the depicted embodiment generally includes a valve body 132, which defines the outer surface 128. A main air passageway 133 is defined in the valve body 132 and extends through the inflation valve 104. In the depicted embodiment the inflation valve 104 is constructed of a metal material, such as brass or stainless steel, however in other embodiments the inflation valve 104 may be constructed of other suitable materials, including, but not limited to, other metal materials, rigid plastic materials, composite materials, or combinations thereof such as, for example, metal fittings with plastic over-moldings.

A first end 135 of the main air passageway 133 is configured to receive a standard air pressure valve (not shown in this embodiment) that is adapted to allow pressurized air to pass through the inflation valve 104 in order to inflate the bladder 102 through the main air passageway 133 and to trap the pressurized air in the interior area 125 of the bladder 102. The standard air pressure valve is also configured to allow the bladder 102 to be manually depressurized. An example of such a device includes, but is not limited to, a Schrader valve, as is commonly used in automobile and bicycle tires. Although other embodiments may vary, a typical standard air pressure valve is generally constructed of a metal material (such as brass or stainless steel) and may include an internal spring and one or more rubber seals. In the depicted embodiment, the standard air pressure valve is insert-molded into the plastic inflation valve 104, however in various other embodiments the standard air pressure valve may be coupled to the inflation valve 104 in any other conventional manner. For example, an internal surface of the main air passageway 133 of the inflation valve 104 may be threaded to receive the standard air pressure valve, the standard air pressure valve may be press-fit into the inflation valve 104, or the standard air pressure valve may be adhered into the opening 133 of the inflation valve 104.

As shown in FIG. 4, the valve body 132 of the inflation valve 104 generally includes a first portion 134 and a second portion 136. In the depicted embodiment, a portion of the outer surface 128 is defined by three intermediate flanges 138 defined in the first portion 134 of the valve body 132. An interior end 140 of the inflation valve 104 is defined in the second portion 136 of the valve body 132. As can best be seen in FIG. 5, in the depicted embodiment the three intermediate flanges 138 include a plurality of aligned openings 142 that extend through the intermediate flanges 138. In particular, the intermediate flanges 138 include six aligned openings 142 that are disposed radially about a center axis 143 of the inflation valve 104. As shown in FIG. 4, each aligned set of openings 142 creates a release channel 144 that includes a release channel inlet 146 located on the intermediate flange 138 located directly above the interior end 140, and a release channel outlet 148 located on the distal intermediate flange 138. The plurality of release channels 144 are configured to allow pressurized air to vent from the interior area 125 of the bladder 102 to the environment. It should be noted that although the depicted embodiment includes six release channels 144, other embodiments may include any number of release channels 144. For example, some embodiments may include as few as one release channel 144.

As will be discussed in more detail below, the interior end 140 of the depicted embodiment defines an edge surface 150 that is surrounded by a sealing portion of the bladder wall 114. Notably, the interior end 140 does not include any openings (other than the main air passageway 133), and in the uninflated condition, the release channel inlets 146 are essentially blocked by the bladder wall 114 (see FIG. 2). In the depicted embodiment, although various different configuration of the inflation valve 104 are possible, the edge surface 150 of the interior end 140 extends beyond the outer surface 128 of the three intermediate flanges 138. In such a manner, the sealing portion of the bladder wall 114 wraps around a portion of the interior end 140, and (unless the bladder 102 is overinflated as described below) air inside the interior area 125 of the bladder 102 is blocked from accessing the release channel inlets 146.

FIG. 6 shows a typical section 10 of a pipe system that includes a clean-out tee 12 having an access port 14. The pipe section 10 is generally cylindrical and defines an internal pipe wall 16. The pneumatic test plug 100 of the depicted embodiment of the present invention is shown in an uninflated condition and thus may be inserted into the pipe section 10 above the clean-out tee 12. Although these features are not shown in the figure, the pneumatic test plug 100 is configured to be connected to a pressurized air source (such as an air compressor, or a hand or foot pump) using an air hose or other flexible member adapted to supply pressurized air from the pressurized air source. The pneumatic test plug 100 may also include a handle device (as described above). It should be noted that although the pneumatic test plug 100 is shown in the figure as being used to block a portion of a vertical pipe section 10 above the clean-out tee 12, pneumatic test plugs of various embodiments of the present invention may be used in a variety of different orientations and thus may be used with various pipe systems having a variety of configurations, including, but not limited to, horizontal and angled pipe systems. It should also be noted that although the pneumatic test plug 100 is shown in the figure inserted through a clean-out tee access opening, pneumatic test plugs of various embodiments of the present invention may be inserted through other types of access openings, including, for example, roof vents, storm drains, closet bends, and pipe ends.

The pneumatic test plug 100 of the depicted embodiment is configured to be inflated from an uninflated condition to an inflated condition. The uninflated condition permits the pneumatic test plug 100 to be inserted or removed from the pipe section 10. The inflated condition permits the pneumatic test plug 100 to be used to test the pipe section 10 by sealing a portion of the pipe section 10. This allows the operator to introduce a fluid or gaseous test media (such as water or air) into the pipe section 10 above the pneumatic test plug 100. In the depicted embodiment, the pneumatic test plug 100 is configured to be inflated using the pressurized air source, which causes pressurized air to travel through the inflation valve 104 via the standard air pressure valve and into the interior area 125 of the bladder 102. As the bladder 102 continues to fill with pressurized air, the bladder wall 114 begins to expand outwardly eventually contacting the internal pipe wall 16 of the pipe section 10 to create a seal against the inner pipe wall 16. Pressurized air may continue to be introduced into the interior area 125 of the bladder 102 in order to exert more pressure against the internal pipe wall 16 of the pipe section 10.

FIG. 7 shows a cross-section view of the pipe section 10 and pneumatic test plug 100 in an overinflated condition. As noted above, existing pneumatic test plugs may be prone to problems when overinflated. However, the present invention solves this problem by allowing some of the pressurized air in the interior area 125 of the bladder 102 to vent to the environment when the pneumatic test plug is overinflated. Referring to the figure, since most of the bladder wall 114 is firmly pressed against the internal pipe wall 16 of the pipe section 10, when the pneumatic test plug 100 is overinflated it is configured such that other portions of the bladder wall 114 will bulge outwardly. In particular, because the collar 130 of the depicted embodiment does not extend into the second portion 136 of the valve body 132, the bladder 102 is configured such that the sealing portion 152 of the bladder wall 114 wrapped around the edge surface 150 of the interior end 140 of the inflation valve 104 will move outwardly. In such a manner, the sealing portion 152 of the bladder wall 114 will peel away from the edge surface 150 of the interior end 140 and pressurized air from the interior area 125 of the bladder 102 will be permitted to travel around the edge surface 150 of the interior end 140 and into the inlets 146 of the plurality of release channels 144, thus relieving a portion of the pressure in the bladder 102. Once an appropriate pressure has been reached, the sealing portion 152 of the bladder wall 114 will contract back around the edge surface 150 of the interior end 140, again blocking the inlets 146 of the release channels 144.

In various embodiments, the internal air pressure at which the bladder wall 114 separates from a portion of the outer surface 128 of the inflation valve 104 may be determined by the material properties of the bladder wall 114 and/or by the geometry of the bladder 102. For example, the thickness and/or the geometry of the bladder wall 114 in the area around the second portion 136 of the inflation valve 104 are important variables in establishing the internal air pressure at which the bladder wall 114 separates from the inflation valve 104. As such, these and other variables may be modified in order to provide different embodiments of the pneumatic test plug 100 that are configured to release air to the environment at different internal pressures.

It should be noted that various other embodiments of the present invention are possible that include an inflation valve having at least one release channel disposed proximate a portion of the outer surface of the inflation valve, wherein overinflation of the bladder causes a portion of the interior surface of the bladder wall to separate from the outer surface of the inflation valve, thus releasing air from the inner area to the environment through the release channel.

For example, FIG. 8 depicts another exemplary embodiment of the present invention. In particular, FIG. 8 shows a front cross-section view of a pneumatic test plug 100 in accordance with another embodiment of the present invention. In general, the pneumatic test plug 100 of the depicted embodiment includes a bladder 102 and an inflation valve 104. The bladder 102 defines a bladder wall 114 and has an open end 116 and a closed end 118. The bladder wall 114 defines an interior surface 120 and an exterior surface 122, and an interior area 125 is bounded by the interior surface 120 of the bladder wall 114. A series of ribs 124 are defined in the exterior surface 122 of the bladder wall 114 that extend around the exterior surface 122. Although the bladder 102 of various other embodiments of the present invention may have other shapes, the bladder 102 of the depicted embodiment is generally bottle shaped. A portion of the open end 116 of the bladder wall 114 is configured to couple to the inflation valve 104. Although other coupling methods are possible, in the depicted embodiment the inflation valve 104 is secured using a collar 130 that may be crimped. Other coupling methods may include, for example, insert molding the inflation valve 104 into the open end 116 of the bladder 102.

FIG. 9 is a cross-section view of an inflation valve 104 of the pneumatic test plug 100 of FIG. 8. FIG. 10 is a front view of the inflation valve 104. The inflation valve 104 of the depicted embodiment generally includes a valve body 132, which defines a main air passageway 133 and an outer surface 128. As shown in the figure, the main air passageway 133 is configured to receive a standard air pressure valve 137 (such as a Schrader valve) that is adapted allow pressurized air to pass through the inflation valve 104 into the bladder 102 to inflate the bladder 102 and to trap the pressurized air in the interior area 125 of the bladder 102. The standard air pressure valve 137 is also adapted to allow the bladder 102 to be manually depressurized. Although the standard air pressure valve 137 may be coupled to the inflation valve 104 in any manner, in the depicted embodiment the standard air pressure valve 137 is insert-molded into the inflation valve 104.

As shown in FIG. 9 and FIG. 10, the valve body 132 generally includes a first portion 134 and a second portion 136. In the depicted embodiment, the second portion 136 includes an interior end 140. Above the interior end 140 is a groove 141 that extends around the valve body 132. As can best be seen in FIG. 9, the valve body 132 also defines a plurality of release channels 144 that include release channel inlets 146 located above the interior end 140 and release channel outlets 148 located on a top surface 149 of the valve body 132. The release channels 144 are configured to allow pressurized air to vent from the interior area 125 of the bladder 102 to the environment. The interior end 140 defines an edge surface 150 that is surrounded by a sealing portion 152 of the interior surface 120 of the bladder wall 114. The interior end 140 does not include an opening (other than the opening 133), and in the uninflated condition, the release channel inlets 146 are essentially blocked by the bladder wall 114 (see FIG. 8). In the depicted embodiment, the edge surface 150 of the interior end 140 extends beyond the outer surface 128 of the valve body 132. In such a manner, the sealing portion 152 of the bladder wall 114 wraps around a portion of the interior end 140, and (unless the bladder is overinflated as described below) air inside the interior area 125 of the bladder 102 is blocked from accessing the release channel inlets 146.

The pneumatic test plug 100 of the depicted embodiment is configured to be inflated from an uninflated condition to an inflated condition. The uninflated condition permits the pneumatic test plug 100 to be inserted or removed from a pipe section. The inflated condition permits the pneumatic test plug 100 to be used to test the pipe section by sealing a portion of a pipe section. This allows the operator to introduce a fluid or gaseous test media (such as water or air) into the pipe section above the pneumatic test plug 100. The pneumatic test plug 100 is inflated using the pressurized air source, which causes pressurized air to travel through the inflation valve 104 via the standard air pressure valve and into the interior area 125 of the bladder 102. As the bladder 102 continues to fill with pressurized air, the bladder wall 114 begins to expand outwardly until it contacts the internal pipe wall of the pipe section and creates a seal against the inner pipe wall.

Although this embodiment is not shown in an overinflated condition, if overinflation occurs, the bladder wall 114 continues to expand outwardly. Since a portion of the bladder wall 114 is firmly pressed against the internal pipe wall of the pipe section, other portions of the bladder wall 114 begin to bulge outwardly, including the sealing portion 152 of the bladder wall wrapped around the edge surface 150 of the interior end 140 of the inflation valve 104. In such a manner, the sealing portion 152 of the bladder wall 114 is peeled away from the edge surface 150 of the interior end 140 and pressurized air from the interior area 125 of the bladder 104 is permitted to travel around the edge surface 150 of the interior end 140 and into to the inlets 146 of the plurality of release channels 144, thus relieving a portion of the pressure in the bladder 102. Once an appropriate pressure has been reached, the sealing portion 152 of the bladder wall 114 contracts back around the edge surface 150 of the interior end 140, again blocking access to the inlets 146 of the release channels 144. As noted above, the internal air pressure at which the bladder wall 114 separates from a portion of the outer surface 128 of the inflation valve 104 may be established by the material properties of the bladder 102 and/or by the geometry of the bladder wall 114.

It should be noted that in each of the embodiments described above, overinflation of the bladder releases air into the environment by causing the sealing portion of the bladder wall to peel away from the interior end of the inflation valve, thus uncovering an inlet of a release channel. However in other embodiments of the present invention, a sealing portion of the bladder wall may uncover an inlet of a release channel in other ways, for example, by sliding to uncover the inlet of the release channel.

Many modifications and other embodiments of the invention set forth herein will come to mind to one skilled in the art to which this invention pertain having the benefit of the teachings presented in the foregoing descriptions and the associated drawings. Therefore, it is to be understood that the invention is not to be limited to the specific embodiments disclosed and that modifications and other embodiments are intended to be included within the scope of the appended claims. Although specific terms are employed herein, they are used in a generic and descriptive sense only and not for purposes of limitation.

That which is claimed:

1. A pneumatic test plug for use with a pipe having a generally cylindrical internal pipe wall, the pneumatic test plug comprising:
   an inflatable bladder formed by a bladder wall that is elastically deformable; and
   an inflation valve mounted in the bladder wall such that an interior end of the inflation valve is in fluid communication with an interior area defined within the bladder, the inflation valve defining a main air passageway through which air is introduced into the interior area, and a separate release channel having an inlet disposed toward the interior end of the inflation valve and an outlet in fluid communication with an exterior environment outside the bladder;
   wherein the valve is mounted in the bladder wall such that a sealing portion of the bladder wall when in a sealed position engages the interior end of the inflation valve and sealingly closes the inlet of the release channel, and when said sealing portion is elastically deflected by overinflation of the bladder, said sealing portion uncovers the inlet of the release channel to allow air to escape from the interior area of the bladder through the release channel to the exterior environment, said sealing portion elastically returning to the sealed position when sufficient release of air has occurred.

2. The pneumatic test plug of claim 1, wherein the inflation valve further defines a first portion, and a second portion defining the interior end, wherein the interior end of the inflation valve is proximate the sealing portion of the bladder wall, and wherein overinflation of the bladder causes the sealing portion of the bladder wall to separate from the interior end of the inflation valve.

3. The pneumatic test plug of claim 1, wherein the inflation valve includes a plurality of release channels disposed radially about a center axis of the inflation valve.

4. The pneumatic test plug of claim 2, further comprising a collar and wherein the collar is configured to couple the first portion of the inflation valve to an open end of the bladder.

5. The pneumatic test plug of claim 2, wherein the inflation valve is insert-molded inside an open end of the bladder.

6. The pneumatic test plug of claim 2, wherein the interior end the inflation valve includes a flange and a release channel inlet, the flange defining an edge surface and the release channel inlet being located above the flange and leading to the release channel, wherein the sealing portion of the bladder wall substantially surrounds the edge surface of the flange and blocks the release channel inlet, and wherein overinflation of the bladder causes a portion of the interior surface of the bladder wall to separate from the edge surface of the flange, thus releasing air from the interior area of the bladder around the edge surface of the flange and into the release channel inlet.

7. The pneumatic test plug device of claim 1, wherein the inflation valve further includes a Schrader valve located approximately in the center of the inflation valve, and wherein the Schrader valve is configured to allow pressurized air to enter the interior area of the bladder and to allow manual depressurization of the bladder.

8. The pneumatic test plug of claim 7, wherein the Schrader valve is insert-molded inside the inflation valve.

9. The pneumatic test plug of claim 1, wherein the bladder wall includes one or more ribs disposed around the exterior surface of the bladder wall, and wherein the one or more ribs are configured to facilitate sealing against the internal pipe wall.

10. The pneumatic test plug of claim 1, further comprising a handle device, wherein the handle device is configured to facilitate removal of the pneumatic test plug from the pipe in an uninflated position.

11. An inflation valve for use with an inflatable bladder formed by a bladder wall that is elastically deformable, the bladder defining an interior area within the bladder, said inflation valve comprising:
   an interior end that is in fluid communication with the interior area of the bladder;
   a main air passageway through which air is introduced into the interior area of the bladder; and
   a separate release channel having an inlet disposed toward the interior end and an outlet in fluid communication with an exterior environment outside the bladder,
   wherein the inflation valve is configured to be mounted in the bladder wall such that a sealing portion of the bladder wall when in a sealed position engages the interior end and sealingly closes the inlet of the release channel, and when said sealing portion is elastically deflected by overinflation of the bladder, said sealing portion uncovers the inlet of the release channel to allow air to escape from the interior area of the bladder through the release channel to the exterior environment, said sealing portion elastically returning to the sealed position when sufficient release of air has occurred.

12. The inflation valve of claim 11, wherein the inflation valve further defines a first portion, and a second portion defining the interior end, wherein the interior end is proximate the sealing portion of the bladder wall, and wherein overinflation of the bladder causes the sealing portion of the bladder wall to separate from the interior end.

13. The inflation valve of claim 11, wherein the inflation valve includes a plurality of release channels disposed radially about a center axis.

14. The inflation valve of claim 12, wherein the first portion of the inflation valve is configured to be coupled to an open end of the bladder using a collar.

15. The inflation valve of claim 12, wherein the inflation valve is configured to be insert-molded inside an open end of the bladder.

16. The inflation valve of claim 12, wherein the interior end of the inflation valve includes a flange and a release channel inlet, the flange defining an edge surface and the release channel inlet being located above the flange and leading to the release channel, wherein the sealing portion of the bladder wall substantially surrounds the edge surface of the flange and blocks the release channel inlet, and wherein overinflation of the bladder causes a portion of the interior surface of the bladder wall to separate from the edge surface of the flange, thus releasing air from the interior area of the bladder around the edge surface of the flange and into the release channel inlet.

17. The inflation valve of claim 11, wherein the inflation valve further includes a Schrader valve located approximately in the center of the inflation valve, and wherein the Schrader valve is configured to allow pressurized air to enter the interior area of the bladder and to allow manual depressurization of the bladder.

18. The inflation valve of claim 17, wherein the Schrader valve is insert-molded inside the inflation valve.

* * * * *